United States Patent
Shintani et al.

(10) Patent No.: US 10,665,207 B2
(45) Date of Patent: May 26, 2020

(54) BACK-AND-FORTH DISPLACEMENT DETECTING DEVICE AND INFORMATION PROCESSING DEVICE

(71) Applicant: KYOCERA Document Solutions Inc., Osaka (JP)

(72) Inventors: Kazushi Shintani, Osaka (JP); Atsushi Yamada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 1 day.

(21) Appl. No.: 16/185,943

(22) Filed: Nov. 9, 2018

(65) Prior Publication Data
US 2019/0180720 A1     Jun. 13, 2019

(30) Foreign Application Priority Data

Dec. 13, 2017 (JP) .................. 2017-238956
Dec. 13, 2017 (JP) .................. 2017-238957

(51) Int. Cl.
*G09G 5/38* (2006.01)
*G06F 3/0485* (2013.01)
(Continued)

(52) U.S. Cl.
CPC .............. *G09G 5/38* (2013.01); *G06F 1/1694* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS

| 6,738,042 B1 | 5/2004 | Nobukiyo |
| 7,109,876 B2 * | 9/2006 | Smith ....................... G06F 1/28 340/5.74 |

(Continued)

FOREIGN PATENT DOCUMENTS

| JP | 2000-194693 A | 7/2000 |
| JP | 2010-193066 A | 9/2010 |

(Continued)

OTHER PUBLICATIONS

Pwick, "Application Review: Ultimate Rotation Control (Android)", https://www.youtube.com/watch?v=wkUbK2ss28Q, 2013. (Year: 2013).*

(Continued)

*Primary Examiner* — Nicholas R Wilson
(74) *Attorney, Agent, or Firm* — IP Business Solutions, LLC (57) ABSTRACT

A back-and-forth displacement detecting device includes: a sensor that detects an amount of displacement of an information processing device and outputs a detection signal indicating the amount of displacement; and a determination section that determines that, if the amount of displacement indicated by the detection signal exceeds a positive threshold value in one of a former period and a latter period which are time periods of predetermined length before and after a point in time when the detection signal indicates an amount of displacement of zero, the amount of displacement indicated by the detection signal in the other period falls below a negative threshold value, and a sum of the amounts of displacement over both the former and latter periods falls within a predetermined range, the information processing device has performed a displacement of back-and-forth movement from an initial state and has returned to the initial state.

6 Claims, 9 Drawing Sheets

(51) Int. Cl.
*G06F 3/0482* (2013.01)
*G06F 3/0346* (2013.01)
*G06F 3/01* (2006.01)
*G06F 1/16* (2006.01)
*G01P 3/00* (2006.01)
*G01P 15/18* (2013.01)

(52) U.S. Cl.
CPC .......... *G06F 3/0482* (2013.01); *G06F 3/0485* (2013.01); *G01P 3/00* (2013.01); *G01P 15/18* (2013.01); *G09G 2340/0492* (2013.01)

(56) References Cited

U.S. PATENT DOCUMENTS

| | | |
|---|---|---|
| 2011/0208472 A1 | 8/2011 | Fujiwara |
| 2012/0001943 A1 | 1/2012 | Ishidera |
| 2012/0299964 A1 | 11/2012 | Homma et al. |
| 2013/0120256 A1 | 5/2013 | Ishidera et al. |
| 2013/0282325 A1 | 10/2013 | Takahashi et al. |
| 2014/0039827 A1 | 2/2014 | Yuzawa |
| 2015/0022434 A1 | 1/2015 | Matas |
| 2015/0049119 A1 | 2/2015 | Homma et al. |
| 2017/0109866 A1 | 4/2017 | Homma et al. |

FOREIGN PATENT DOCUMENTS

| | | |
|---|---|---|
| JP | 2012-014022 A | 1/2012 |
| JP | 2012-247959 A | 12/2012 |
| JP | 5423894 B2 | 2/2014 |

OTHER PUBLICATIONS

Chehimi et al., "Motion Controlled Mobile 3D Multiplayer Gaming", ACM 2008. (Year: 2008).*
Extended European Search Report dated Apr. 10, 2019 mailed in the corresponding European Patent Application No. 18207806.3.

* cited by examiner

BACK-AND-FORTH DISPLACEMENT DETECTING DEVICE AND INFORMATION PROCESSING DEVICE

INCORPORATION BY REFERENCE

This application claims priority to Japanese Patent Application No. 2017-238956, No. 2017-238957 filed on Dec. 13, 2017, the entire contents of which are incorporated by reference herein.

BACKGROUND

The present disclosure relates to back-and-forth displacement detecting devices for detecting back-and-forth movement and information processing devices with the same and particularly relates to a technique for simplifying arithmetic processing for determining back-and-forth movement. Furthermore, the present disclosure relates to portable information processing devices with display sections and particularly relates to a technique for switching among displays on the display section.

For example, in a general portable information device, a plurality of acceleration sensors are attached to the upper, lower, left, and right sides thereof and the acceleration sensors detect accelerations produced by turning operations of the portable information device. Then, a CPU of the portable information device determines, based on the acceleration detected by each acceleration sensor, a turning operation of the portable information device and executes an instruction on a character input and a character conversion which are assigned to the turning operation.

SUMMARY

A technique improved over the aforementioned technique is proposed as one aspect of the present disclosure.

A back-and-forth displacement detecting device according to an aspect of the present disclosure includes a sensor and a determination section. The sensor detects an amount of displacement of an information processing device and outputs a detection signal indicating the amount of displacement. The determination section determines that, if the amount of displacement indicated by the detection signal exceeds a positive threshold value in one of a former period and a latter period which are time periods of predetermined length before and after a point in time when the detection signal indicates an amount of displacement of zero, the amount of displacement indicated by the detection signal in the other of the former period and the latter period falls below a negative threshold value, and a sum of the amounts of displacement indicated by the detection signal over both the former and latter periods falls within a predetermined range, the information processing device has performed a displacement of back-and-forth movement from an initial state and has returned to the initial state.

An information processing device according to another aspect of the present disclosure includes the above-described back-and-forth displacement detecting device according to the present disclosure, a display section, and a control section that changes, when the determination section of the back-and-forth displacement detecting device determines what type of displacement of back-and-forth movement the information processing device has performed, contents to be displayed on the display section according to the determined type of displacement of back-and-forth movement.

DETAILED DESCRIPTION

Hereinafter, a description will be given of an embodiment of the present disclosure with reference to the drawings.

Figure 1:
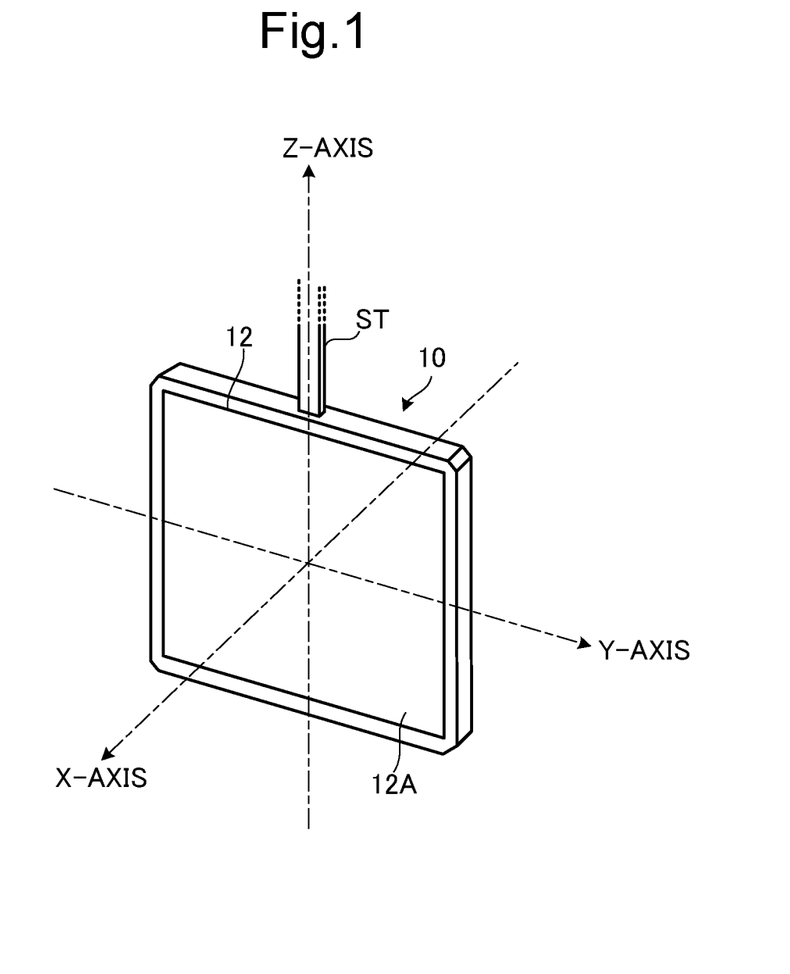
FIG. 1 is a perspective view showing an appearance of an information processing device according to one embodiment of the present disclosure.
Figure 2:
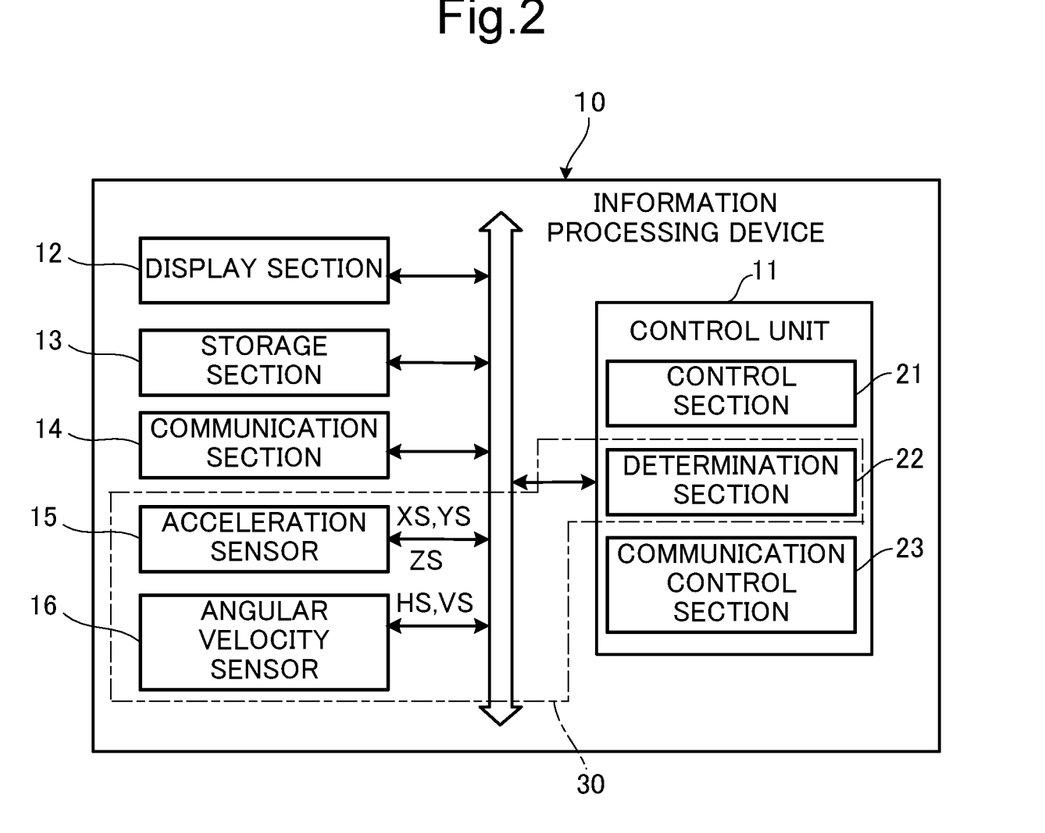
FIG. 2 is a block diagram showing an internal configuration of the information processing device according to the embodiment.

FIG. 1 is a perspective view showing an appearance of an information processing device to which a back-and-forth displacement detecting device according to one embodiment of the present disclosure is applied. FIG. 2 is a block diagram showing an internal configuration of the information processing device.

An information processing device 10 according to this embodiment is used in place of an ID card, such as a company ID card. As shown in FIG. 1, the information processing device 10 has the shape of, for example, a portable card and is provided with a strap (fitting member) ST. The information processing device 10 include, as shown in FIG. 2, a control unit 11, a display section 12, a storage section 13, a communication section 14, an acceleration sensor 15, and angular velocity sensors 16. These components are capable of data or signal transfer via a bus among them.

The display section 12 is formed of a liquid crystal display (LCD), an organic EL (OLED: organic light-emitting diode) display, an electronic paper or the like.

The storage section 13 is a large-capacity, rewritable, non-volatile memory (such as an EEPROM) and stores a plurality of types of contents to be displayed on the display section 12.

The communication section 14 is a communication interface and transfers data to and from an external transmitter (such as a beacon), server or the like.

The acceleration sensor 15 is a known, three-axis acceleration sensor and has the function of detecting accelerations in three directions, i.e., X-axis, Y-axis, and Z-axis directions, of the information processing device 10 (particularly, the display section 12) and outputting respective detection signals XS, YS, and ZS indicating the accelerations in the three directions. Since the acceleration sensor 15 is contained in the information processing device 10, the accelerations in the three directions applied to the information processing device 10 are detected by the acceleration sensor 15.

The angular velocity sensors 16 are known angular velocity sensors and each have the function of detecting the angle of turn of the information processing device 10 (particularly, the display section 12) about a reference axis. Since the angular velocity sensors 16 are contained in the information processing device 10, the angles of turn of the information processing device 10 about the reference axes are detected by the angular velocity sensors 16. Furthermore, in this embodiment, two angular velocity sensors 16 are provided to detect turning in a horizontal direction H and turning in a vertical direction V of the information processing device 10 and output respective detection signals HS and VS indicating the respective angles of turn in the horizontal and vertical directions H and V.

In other words, the acceleration sensor 15 and the angular velocity sensors 16 detect amounts of displacement of the information processing device 10 and output detection signals indicating the amounts of displacement.

The control unit 11 is formed of a processor, a RAM (random access memory), a ROM (read only memory), and so on. The processor is, for example, a CPU, an MPU or an ASIC. When a control program stored in the above ROM or the storage section 13 is executed by the above processor, the control unit 11 functions as a control section 21, a determination section 22, and a communication control section 23. Alternatively, each component of the control unit 11 may not be implemented by the operation of the control unit 11 in accordance with the above control program but may be constituted by a hardware circuit.

The control section 21 mainly controls the display on the display section 12. The communication control section 23 has the function of controlling the communication operation of the communication section 14.

The determination section 22 receives the detection signals XS, YS, and ZS from the acceleration sensor 15 and the detection signals HS and VS from the two angular velocity sensors 16 and arithmetically calculates, based on these detection signals, the orientation and displacement of the information processing device 10. In this embodiment, because the display section 12 and the information processing device 10 are integrated as shown in FIG. 1, the term "orientation and displacement of the information processing device 10" here also refers to the orientation and displacement of the display section 12. For example, the determination section 22 determines, with a screen image displayed on a screen 12A of the display section 12 and based on the detection signals, whether the information processing device 10 is oriented in a vertical forward direction U shown in FIG. 7A or a vertical reverse direction D shown in FIG. 7B.

Next, a description will be given of a back-and-forth displacement detecting device 30 according to this embodiment which is applied to the information processing device 10.

Figure 3A:
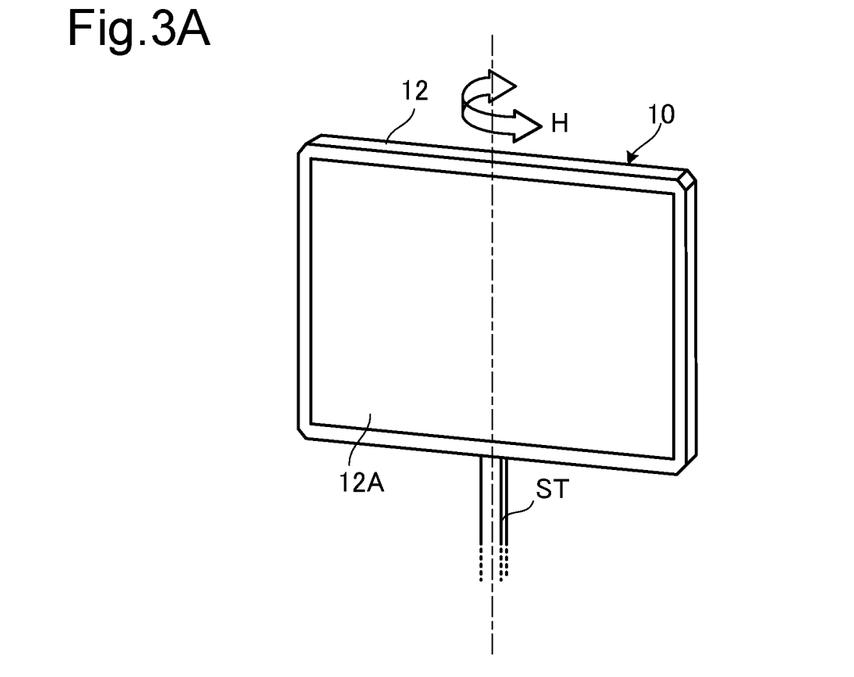
FIG. 3A is a perspective view showing a back-and-forth turning of the information processing device in a horizontal direction.
Figure 3B:
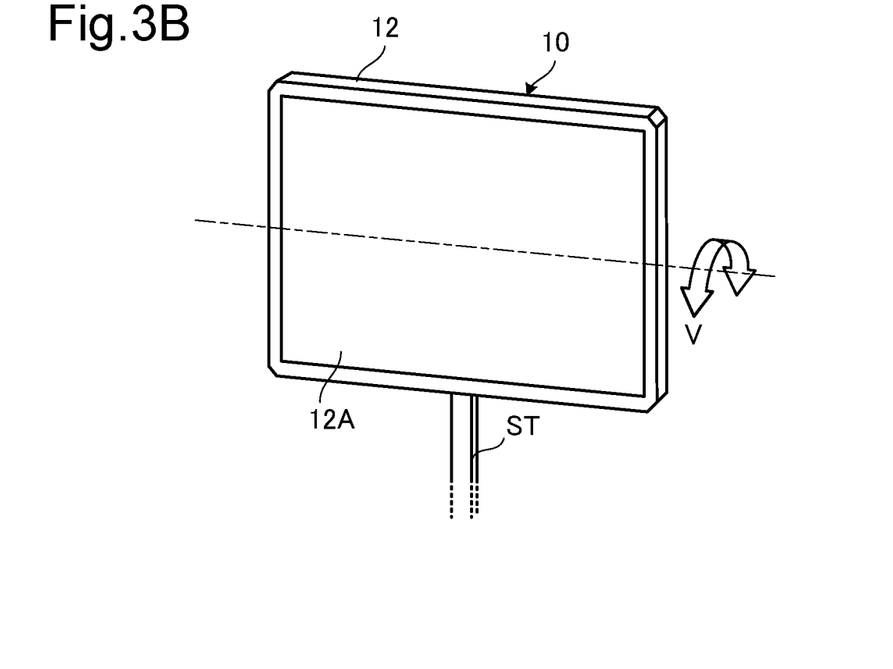
FIG. 3B is a perspective view showing a back-and-forth turning of the information processing device in a vertical direction.
Figure 4:
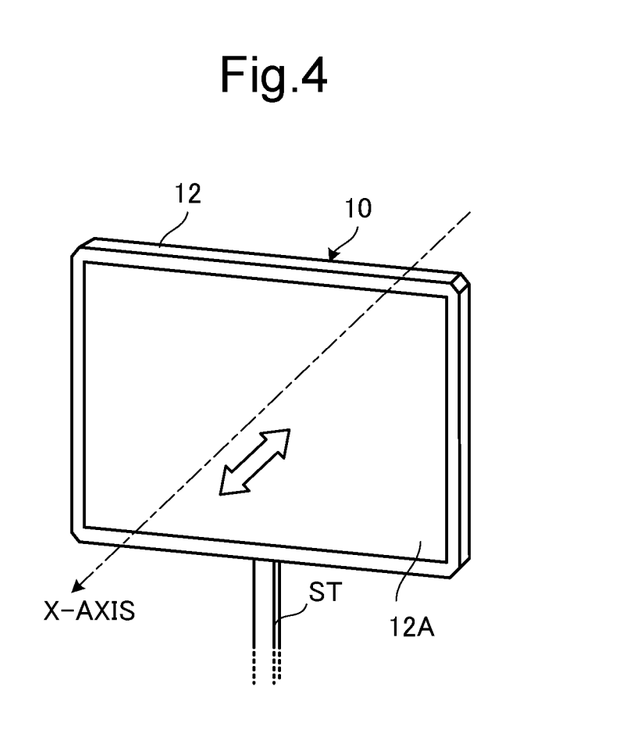
FIG. 4 is a perspective view showing a back-and-forth movement of the information processing device in an X-axis direction.

The back-and-forth displacement detecting device 30 according to this embodiment comprises the acceleration sensor 15, the two angular velocity sensors 16, and the determination section 22 (see FIG. 2), and the determination section 22 determines, as types of displacement of the information processing device 10, back-and-forth turnings (turning operations) in a horizontal direction H and a vertical direction V as shown in FIGS. 3A and 3B based on respective detection signals HS and VS of the angular velocity sensors 16 and determines, as a type of displacement of the information processing device 10, a back-and-forth movement (translation operation) in the X-axis direction as shown in FIG. 4 based on a detection signal XS of the acceleration sensor 15.

<Determination of Back-and-Forth Turnings of Information Processing Device 10 in Horizontal Direction H and Vertical Direction V>

The angular velocity sensors 16 detect respective turnings of the information processing device 10 in the horizontal direction H and the vertical direction V, one of the angular velocity sensors 16 outputs a detection signal HS indicating the turning in the horizontal direction H, and the other outputs a detection signal VS indicating the turning in the vertical direction V. The determination section 22 determines, based on the detection signal HS of the one angular velocity sensor 16, whether a back-and-forth turning of the information processing device 10 in the horizontal direction H has been performed and determines, based on the detection signal VS of the other angular velocity sensor 16, whether a back-and-forth turning of the information processing device 10 in the vertical direction V has been performed.

Figure 5:
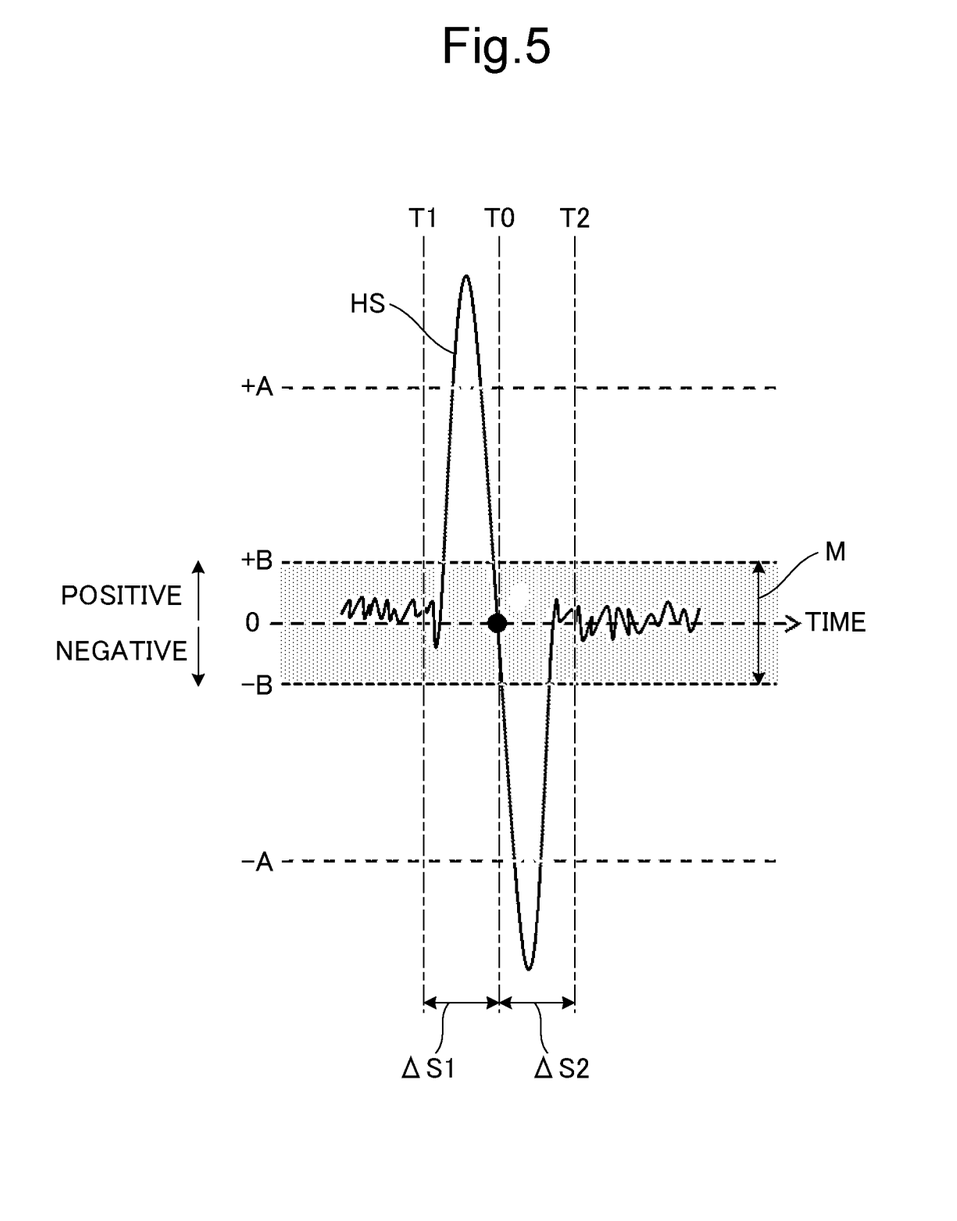
FIG. 5 is a graph showing changes in detection signal of an angular velocity sensor when the information processing device is turned back and forth.

FIG. 5 shows changes in detection signal HS of the angular velocity sensor 16 when a back-and-forth turning of the information processing device 10 in the horizontal direction H has been performed. The term "back-and-forth turning" refers to a back-and-forth movement of the information processing device 10 first turning in one direction from an initial state and then turning in the opposite direction back to the initial state. When the information processing device 10 is turned back and forth in the horizontal direction H, as shown in FIG. 5, the value of the detection signal HS (indicating the amount of displacement of the information processing device 10) of the angular velocity sensor 16 first increases in a positive direction in the outward trip of the back-and-forth turning, exceeds a threshold value +A, reaches a positive peak, then decreases, reaches an amount of displacement of zero at a point in time T0, further decreases in a negative direction in the return trip of the back-and-forth turning, falls below a threshold value −A, reaches a negative peak, then increases again, and then settles around an amount of displacement of zero.

Now suppose that a time zone from a point in time T1 when the detection signal HS starts increasing in the positive direction until the point in time T0 is defined as a former period ΔS1, while a time zone from when the detection signal HS starts decreasing in the negative direction at the point in time T0 until a point in time T2 when the signal value settles around an amount of displacement of zero is defined as a latter period ΔS2. In this case, the detection signal HS exceeds the positive threshold value +A during the former period ΔS1 and falls below the negative threshold value −A during the latter period ΔS2.

Furthermore, the waveform of the detection signal HS on the positive side during the former period ΔS1 (outward trip of the back-and-forth turning) is substantially equal to the waveform of the detection signal HS on the negative side during the latter period ΔS2 (return trip of the back-and-forth turning). Therefore, the sum of the positive integral of the detection signal HS over the former period ΔS1 and the negative integral of the detection signal HS over the latter period ΔS2 becomes small and the sum falls within a predetermined range M extending in both the positive and negative directions from zero.

Figure 6:
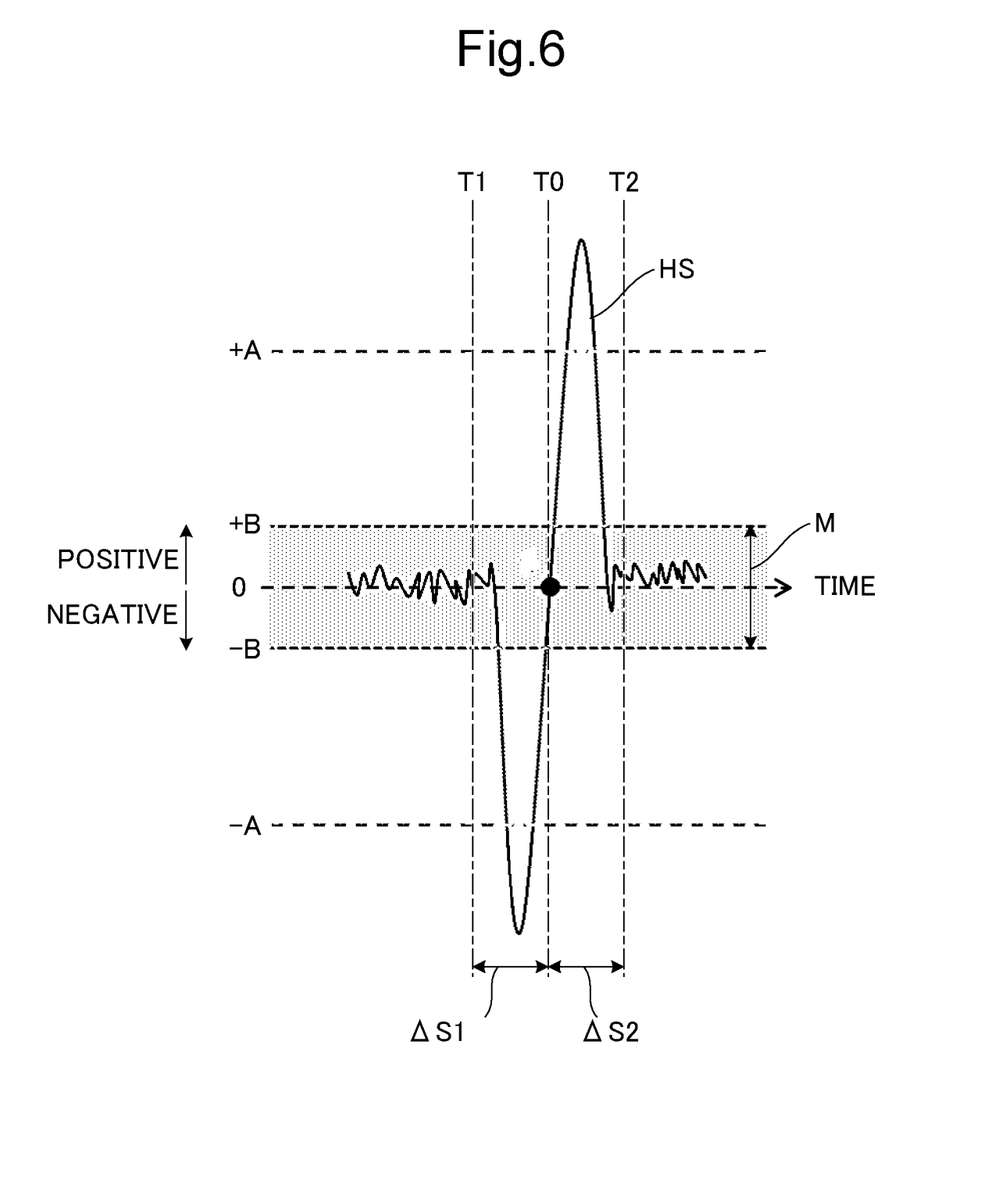
FIG. 6 is a graph showing changes in detection signal of the angular velocity sensor when the information processing device is turned back and forth in reverse order.

On the other hand, when the back-and-forth turning of the information processing device 10 in the horizontal direction H is performed in reverse order, the detection signal HS of the angular velocity sensor 16 changes as shown in FIG. 6. In FIG. 6, the value of the detection signal HS of the angular velocity sensor 16 first decreases in the negative direction in the outward trip of the back-and-forth turning of the information processing device 10, falls below the threshold value −A, reaches a negative peak, then increases, reaches zero at a point in time T0, further increases in the positive direction in the return trip of the back-and-forth turning, exceeds the threshold value +A, reaches a positive peak, and then decreases again. Therefore, the detection signal HS falls below the negative threshold value −A during the former period ΔS1 and exceeds the positive threshold value +A during the latter period ΔS2. Furthermore, the sum of the negative integral of the values of the detection signal HS over the former period ΔS1 and the positive integral of the values of the detection signal HS over the latter period ΔS2 falls within a predetermined range M extending in both the positive and negative directions from zero.

Now suppose that the positive threshold value +A is set at a value sufficiently greater than a positive boundary value +B of the predetermined range M. Also, suppose that the negative threshold value −A is set at a value sufficiently smaller than a negative boundary value −B of the predetermined range M. In other words, the positive boundary value +B of the predetermined range M is set sufficiently smaller than the positive threshold value +A and the negative boundary value −B of the predetermined range M is set sufficiently greater than the negative threshold value −A.

The determination section 22 periodically samples, for example, the value of the detection signal HS, allows, at each time of sampling, the RAM in the control unit 11 to store the value, and allows the RAM to always store the values of the detection signal HS over a length of time from the point in time T1 to the point in time T2. When the detection signal HS reaches zero (a point in time T0 is reached), the determination section 22 reads from the RAM the values of the detection signal HS sampled during the former period ΔS1 before the point in time T0 and the values of the detection signal HS sampled during the latter period ΔS2 after the point in time T0 and determines, based on the read values, whether the information processing device 10 has been turned back and forth in the horizontal direction H. Specifically, if the detection signal HS exceeds the predetermined positive threshold value +A in one of the former period ΔS1 and the latter period ΔS2 and falls below the predetermined negative threshold value −A in the other of the periods ΔS1 and ΔS2 and the sum of the integral of the values of the detection signal HS over the former period ΔS1 and the integral of the values of the detection signal HS over the latter period ΔS2 falls within the predetermined range M, the determination section 22 determines that the information processing device 10 has been turned back and forth in the horizontal direction H.

On the other hand, if (i) the detection signal HS does not exceed the predetermined positive threshold value +A in one of the former period ΔS1 and the latter period ΔS2, (ii) the detection signal HS does not fall below the predetermined negative threshold value −A in, of the former period ΔS1 and the latter period ΔS2, the different period from the case of (i), or (iii) the sum of the integral of the values of the detection signal HS over the former period ΔS1 and the integral of the values of the detection signal HS over the latter period ΔS2 does not fall within the predetermined range M, the determination section 22 does not determine that the information processing device 10 has been turned back and forth in the horizontal direction H.

Likewise, also when the information processing device 10 is turned back and forth in the vertical direction V, the value of the detection signal VS of the angular velocity sensor 16 first increases in a positive direction in the outward trip of the back-and-forth turning of the information processing device 10, exceeds a threshold value +A, then decreases from a positive peak, reaches zero at a point in time T0, further decreases in a negative direction in the return trip of the back-and-forth turning, and falls below a threshold value −A or the value of the detection signal VS of the angular velocity sensor 16 decreases in the negative direction in the outward trip of the back-and-forth turning of the information processing device 10, falls below the threshold value −A, then increases from a negative peak, reaches zero at a point in time T0, further increases in the positive direction in the return trip of the back-and-forth turning, and exceeds the threshold value +A.

Furthermore, the sum of the integral of the values of the detection signal VS over the former period ΔS1 and the integral of the values of the detection signal VS over the latter period ΔS2 falls within a predetermined range M extending in both the positive and negative directions from zero. Therefore, the determination section 22 periodically samples the value of the detection signal VS and allows the RAM to always store the values of the detection signal VS over a length of time from the point in time T1 to the point in time T2. When the detection signal VS reaches zero (a point in time T0 is reached), the determination section 22 reads from the RAM the values of the detection signal VS sampled during the former period ΔS1 before the point in time T0 and the values of the detection signal VS sampled during the latter period ΔS2 after the point in time T0 and determines, based on the read values, whether the information processing device 10 has been turned back and forth in the vertical direction V. Specifically, if the detection signal VS exceeds the predetermined positive threshold value +A in one of the former period ΔS1 and the latter period ΔS2 and falls below the predetermined negative threshold value −A in the other of the periods ΔS1 and ΔS2 and the sum of the integral of the values of the detection signal VS over the former period ΔS1 and the integral of the values of the detection signal VS over the latter period ΔS2 falls within the predetermined range M, the determination section 22 determines that the information processing device 10 has been turned back and forth in the vertical direction V.

Although the above description illustrates the case where the integral of the values of the detection signal over the former period ΔS1 and the integral of the values of the detection signal over the latter period ΔS2 are used for determination, the determination section 22 may determine whether or not the sum of a positive or negative effective value of the detection signal over the former period ΔS1 and a negative or positive effective value of the detection signal over the latter period ΔS2 falls within the predetermined range M. Alternatively, the determination section 22 may determine whether or not the sum of a positive or negative average or peak value of the detection signal over the former period ΔS1 and a negative or positive average or peak value of the detection signal over the latter period ΔS2 falls within the predetermined range M.

<Determination of Back-and-Forth Movement of Information Processing Device 10 in X-Axis Direction>

The acceleration sensor 15 detects the acceleration of the information processing device 10 in the X-axis direction and outputs a detection signal XS indicating the acceleration. The determination section 22 determines, based on the detection signal XS of the acceleration sensor 15, whether a back-and-forth movement of the information processing device 10 in the X-axis direction has been performed.

Also in this case, the value of the detection output XS of the acceleration sensor 15 changes similarly to the value of the detection signal HS of the angular velocity sensor 16 shown in FIG. 5, that is, first increases in a positive direction in the outward trip of the back-and-forth movement, exceeds a threshold value +A, reaches a positive peak, then decreases, reaches zero at a point in time T0, further decreases in a negative direction in the return trip of the back-and-forth movement, falls below a threshold value −A, reaches a negative peak, and then increases again.

On the other hand, when the back-and-forth movement of the information processing device 10 is performed in reverse order, the value of the detection output XS of the acceleration sensor 15 changes similarly to the value of the detection signal HS of the angular velocity sensor 16 shown in FIG. 6, that is, first decreases in the negative direction in the outward trip of the back-and-forth movement of the information processing device 10, falls below the threshold value −A, reaches a negative peak, then increases, reaches zero at a point in time T0, further increases in the positive direction in the return trip of the back-and-forth movement, exceeds the threshold value +A, reaches a positive peak, and then decreases again.

Therefore, the determination section 22 periodically samples the value of the detection signal XS and allows the RAM to always store the values of the detection signal XS over a length of time from the point in time T1 to the point in time T2. When the detection signal XS reaches zero (a point in time T0 is reached), the determination section 22 reads from the RAM the values of the detection signal XS sampled during the former period ΔS1 before the point in time T0 and the values of the detection signal XS sampled during the latter period ΔS2 after the point in time T0 and determines, based on the read values, whether the information processing device 10 has been moved back and forth in the X-axis direction. Specifically, if the detection signal XS exceeds the predetermined positive threshold value +A in one of the former period ΔS1 and the latter period ΔS2 and falls below the predetermined negative threshold value −A in the other of the periods ΔS1 and ΔS2 and the sum of the integral of the values of the detection signal XS over the former period ΔS1 and the integral of the values of the detection signal XS over the latter period ΔS2 falls within the predetermined range M, the determination section 22 determines that the information processing device 10 has been moved back and forth in the X-axis direction.

In this manner, according to this embodiment, it can be determined, from simple arithmetic processing based on outputs from a sensor, such as the angular velocity sensor 16 or the acceleration sensor 15, whether a back-and-forth movement (including a back-and-forth turning) has been done.

Furthermore, like the determination of a back-and-forth movement in the X-axis direction, the determination section 22 may determine a back-and-forth movement of the information processing device 10 in the Y-axis direction based on the detection signal YS of the acceleration sensor 15 or determine a back-and-forth movement thereof in the Z-axis direction based on the detection signal ZS of the acceleration sensor 15.

Figure 7A:
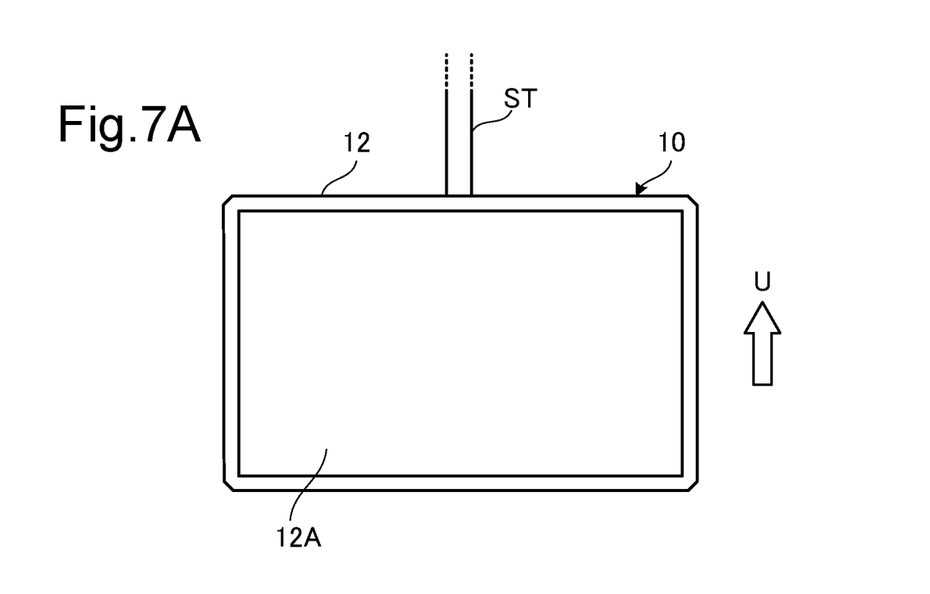
FIG. 7A is a plan view showing the information processing device oriented in a vertical forward direction.
Figure 7B:
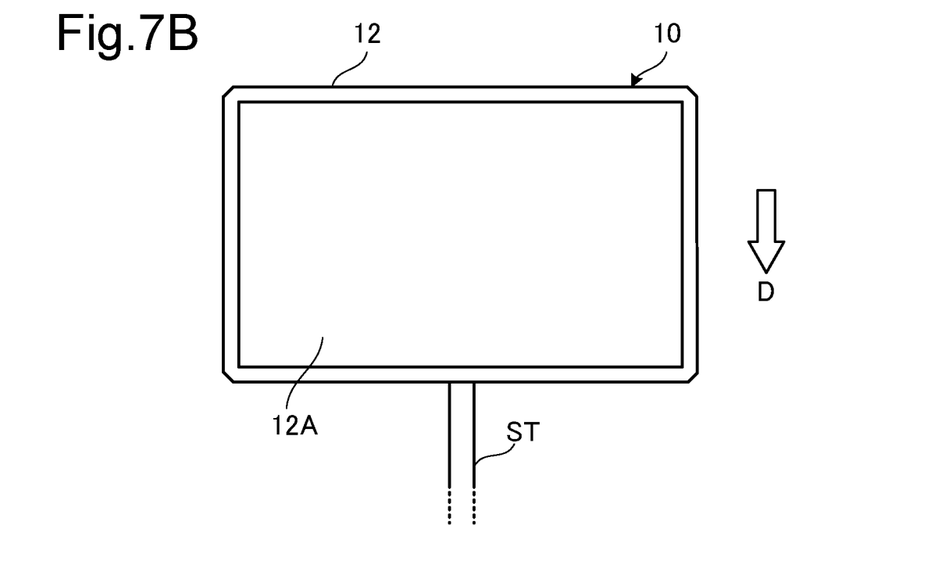
FIG. 7B is a plan view showing the information processing device oriented in a vertical reverse direction.

The determination section 22 not only determines a back-and-forth turning or a back-and-forth movement of the information processing device 10 as a type of displacement thereof but also determines, with a screen image displayed on the screen 12A of the display section 12 as shown in FIGS. 7A and 7B and based on respective detection signals HS and VS of the angular velocity sensors 16 and detection signals XS, YS, and ZS of the acceleration sensor 15, whether the information processing device 10 is oriented in the vertical forward direction U or the vertical reverse direction D. When the information processing device 10 is oriented in the vertical forward direction U as shown in FIG. 7A, the information processing device 10 hangs from the user's neck with a strap ST. On the other hand, when the information processing device 10 is oriented in the vertical reverse direction D as shown in FIG. 7B, the information processing device 10 is held with the user's hand and flipped vertically.

Next, a description will be given of display control for the display section 12 of the information processing device 10.

Figure 8:
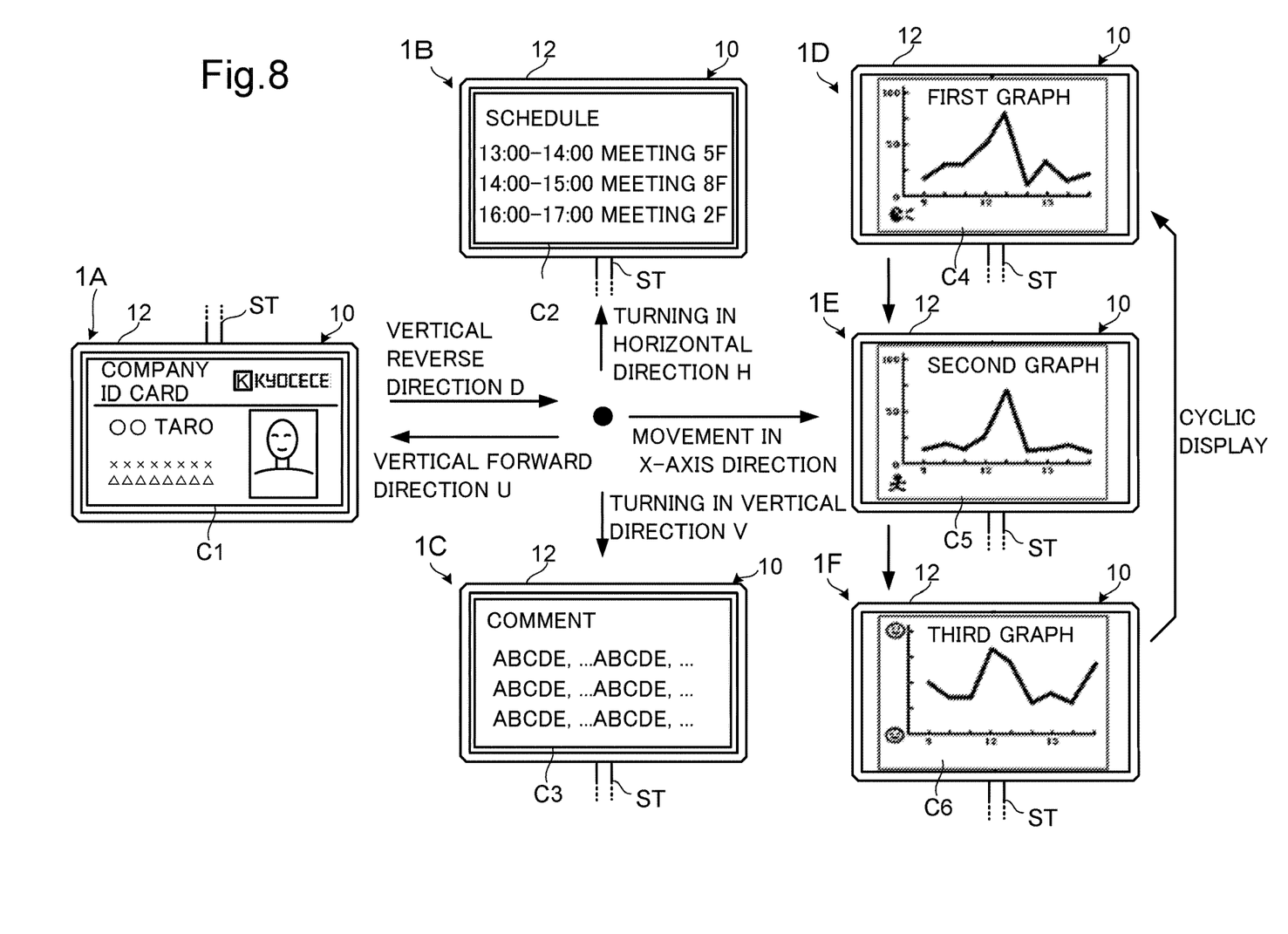
FIG. 8 illustrates various types of contents among which the display on a display section is switched according to the orientation or type of displacement of the information processing device.

In this information processing device 10, a plurality of types of contents each associated with a certain orientation or a certain type of displacement of the information processing device 10 are previously stored in the storage section 13. When the determination section 22 determines the orientation or type of displacement of the information processing device 10, the control section 21 reads the contents associated with the determined orientation or type of displacement from the storage section 13 and allows the display section 12 to display the read contents. Therefore, the contents to be displaced on the display section 12 is changed according to the orientation or type of displacement of the information processing device 10. FIG. 8 illustrates respective types of contents C1 to C6 among which the display on the display section 12 is switched according the orientation or type of displacement of the information processing device 10.

Figure 9:
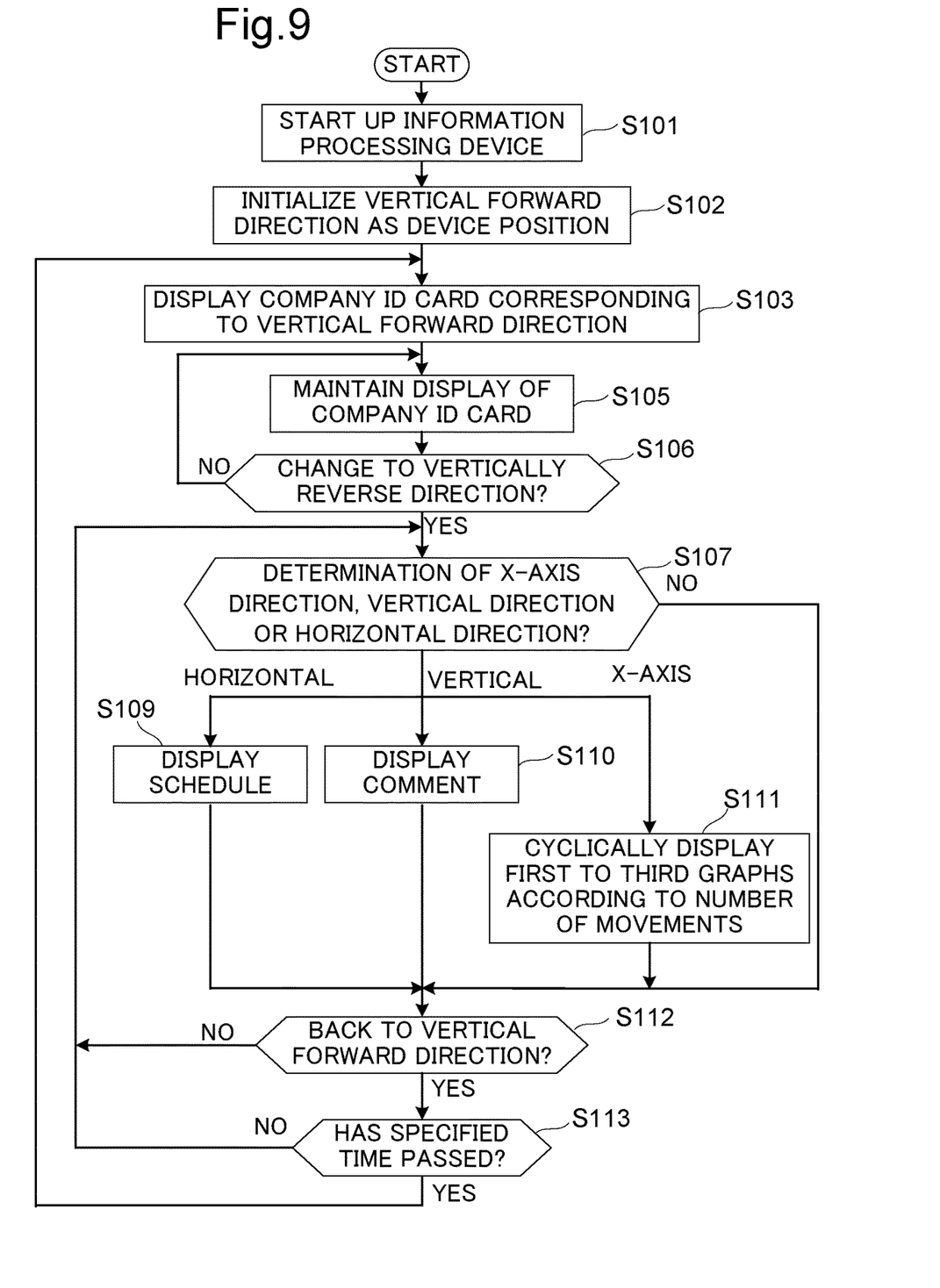
FIG. 9 is a flowchart showing a processing procedure for switching among contents to be displayed on the display section according to the orientation or type of displacement of the information processing device.

Next, a description will be given of a processing procedure for switching among contents to be displayed on the display section 12 according to the orientation or type of displacement of the information processing device 10 with reference to the flowchart shown in FIG. 9.

For example, the user wears the strap ST of the information processing device 10 around his/her neck to allow the information processing device 10 oriented in the vertical forward direction U to hang from the neck. The user starts up, in this state, the information processing device 10 (S101). When the information processing device 10 is started up, the determination section 22 determines the orientation of the information processing device 10 to be the vertical forward direction U, based on the detection signals XS, YS, and ZS from the acceleration sensor 15 and the detection signals HS and VS from the two angular velocity sensor 16 and the control section 21 initializes the orientation of the information processing device 10 as the vertical forward direction U (S102).

At this time, the storage section 13 already stores a company ID card (contents) C1 as contents associated with the vertical forward direction U. The control section 21 reads from the storage section 13 the company ID card (contents) C1 associated with the vertical forward direction U and allows the display section 12 to display the company ID card C1 as shown in Example 1A of FIG. 8 (S103).

While in the above manner the orientation of the information processing device 10 is determined to be the vertical forward direction U, the control section 21 allows the display section 12 to continue to display the company ID card C1, even if the determination section 22 determines that the information processing device 10 has been moved back and forth in the X-axis direction or determines that the information processing device 10 has been turned back and forth in the horizontal direction H or the vertical direction V (S105). Therefore, even if the information processing device 10 hanging by the strap ST swings with user's movement, the company ID card C1 continues to be displayed on the display section 12 so long as the orientation of the information processing device 10 is determined to be the vertical forward direction U.

While the orientation of the information processing device 10 is determined to be the vertical forward direction U, the control section 21 is ready for the determination, by the determination section 22, that the orientation of the information processing device 10 is the vertical reverse direction D (S106). So long as the determination section 22 does not determines that the orientation is the vertical reverse direction D (No in S106), the control section 21 repeats the processing at S105.

When, for example, the user holds the information processing device 10 with his/her hand and flips it vertically and the determination section 22 thus determines that the orientation of the information processing device 10 is the vertical reverse direction D (Yes in S106), the control section 21 becomes ready for the determination, by the determination section 22, that the information processing device 10 has been moved back and forth in the X-axis direction and the determination, by the determination section 22, that the information processing device 10 has been turned back and forth in the vertical direction V or the horizontal direction H (S107).

Then, when as described above the determination section 22 determines that the information processing device 10 has been turned back and forth in the horizontal direction H ("Horizontal" in S107), the control section 21 reads from the storage section 13 a schedule (contents) C2 associated with the horizontal direction H and allows the display section 12 to display the schedule C2 to orient it vertically opposite to the orientation of the company ID card C1 as shown in Example 1B of FIG. 8 (S109).

Alternatively, when the determination section 22 determines that the information processing device 10 has been turned back and forth in the vertical direction V ("Vertical" in S107), the control section 21 reads from the storage section 13 a comment (contents) C3 associated with the vertical direction V and allows the display section 12 to display the comment C3 to orient it vertically opposite to the orientation of the company ID card C1 as shown in Example 1C of FIG. 8 (S110).

Further alternatively, when the determination section 22 determines that the information processing device 10 has been moved back and forth in the X-axis direction ("X-axis" in S107), the control section 21 counts the number of times N of this determination cyclically within a range from 1 to 3 each time the determination section 22 repeatedly determines that the information processing device 10 has been moved back and forth in the X-axis direction. When the count value reaches 1, the control section 21 reads from the storage section 13 an image C4 indicating a first graph and stored in the storage section 13 in association with the count value 1 and allows the display section 12 to display the first graph C4 to orient it vertically opposite to the orientation of the company ID card C1 as shown in Example 1D of FIG. 8.

Then, when the count value reaches 2, the control section 21 reads from the storage section 13 a second graph (contents) C5 stored in the storage section 13 in association with the count value 2 and allows the display section 12 to display the second graph C5 to orient it vertically opposite to the orientation of the company ID card C1 as shown in Example 1E of FIG. 8.

Furthermore, when the count value reaches 3, the control section 21 reads from the storage section 13 a third graph (contents) C6 stored in the storage section 13 in association with the count value 3 and allows the display section 12 to display the third graph C6 to orient it vertically opposite to the orientation of the company ID card C1 as shown in Example 1F of FIG. 8.

When the count value returns to 1 (because the value next to the count value 3 is counted as 1), the control section 21 allows the display section 12 to display the first graph C4 again (S111). In other words, the control section 21 allows the display section 12 to display the first graph C4 to the third graph C6 cyclically according to the number of times that the information processing device 10 moves back and forth in the X-axis direction.

As thus far described, according to this embodiment, when the user holds the information processing device 10 with his/her hand, flips it vertically to change its orientation to the vertical reverse direction D, and then turns the information processing device 10 back and forth in the horizontal direction H while keeping its orientation in the vertical reverse direction D, the schedule C2 is displayed on the display section 12. Alternatively, when the user turns the information processing device 10 back and forth in the vertical direction V from a state of the information processing device 10 being oriented in the vertical reverse direction D, the comment C3 is displayed on the display section 12. Further alternatively, when the user moves the information processing device 10 back and forth in the X-axis direction while keeping its orientation in the vertical reverse direction D, the first graph C4 to the third graph C6 are cyclically displayed according to the number of back-and-forth movements above.

During the above display that switches among the schedule C2, the comment C3, and the first graph C4 to the third graph C6, the control section 21 is ready for the determination, by the determination section 22, that the orientation of the information processing device 10 is the vertical forward direction U (S112). So long as the determination section 22 does not determine that the orientation is the vertical forward direction U (No in S112), the control section 21 repeats the processing from S107. When the determination section 22 determines that the orientation is the vertical forward direction U (Yes in S112), the control section 21 starts to time the duration for which this determination is repeated and retained. Then, the determination section 22 determines whether or not the duration has reached a specified time (for example, five seconds) (S113). If the duration has not yet reached the specified time (No in S113), the control section 21 repeats the processing from S107.

When the duration has reached the specified time (Yes in S113), the control section 21 goes back to S103 and allows the display section 12 to display the company ID card C1 shown in Example 1A of FIG. 8 again. Thus, when thereafter the user wears the strap ST around his/her neck to allow the information processing device 10 to hang from his/her neck, the company ID card C1 is displayed again on the display section 12.

If the determination section 22 makes neither the determination that the information processing device 10 has been moved back and forth in the X-axis direction nor the determination that the information processing device 10 has been turned back and forth in either one of the vertical direction V and the horizontal direction H (No in S107), the control section 21 repeats the processing from S107, provided that the determination section 22 does not determine that the orientation has changed to the vertical forward direction U (No in S112) or that the determination section 22 has determined that the orientation has changed to the vertical forward direction U (Yes in S112) but the duration of this determination has not reached the specified time (No in S113). When the duration has reached the specified time (Yes in S113), the control section 21 goes back to S103 and allows the display section 12 to display the company ID card C1.

As thus far described, in the information processing device 10 according to this embodiment, the company ID card C1 is displayed on the display section 12 while the user wears the strap ST around his/her neck to allow the information processing device 10 to hang from his/her neck. All the while, even if the information processing device 10 is swung by user's movement, the control section 21 maintains the display of the company ID card C1 on the display section 12 so long as the determination section 22 determines that the orientation of the information processing device 10 is the vertical forward direction U. This maintenance of display is suitable for use of the information processing device 10 as an ID card. Furthermore, while the user holds the information processing device 10 with his/her hand to flip it vertically, the display switches among the schedule C2, the comment C3, and the first graph C4 to the third graph C6 according to the back-and-forth turning of the information processing device 10 in the horizontal direction H, the back-and-forth turning thereof in the vertical direction V or the back-and-forth movement thereof in the X-axis direction and the number of back-and-forth movements thereof. Therefore, not only can the information processing device 10 be used as an ID card to display a company staff member ID, but also allow the display to switch among various types of contents with a simple operation.

In the technique shown in BACKGROUND, in determining a turning operation of a portable information device based on the accelerations from a plurality of acceleration sensors, the accelerations are repeatedly calculated based on detection signals of the acceleration sensors and a turning operation corresponding to changes in these accelerations is determined. Therefore, there is a need to perform complicated arithmetic processing at high speed, which increases the load and power consumption of an arithmetic section, such as a CPU. However, such a portable information processing device requires a greater emphasis on reduction in size and weight of the device and power saving and, therefore, increase in load and power consumption of the arithmetic section, such as a CPU, is unfavorable for the device.

Unlike the above, in this embodiment, it can be determined, from simple arithmetic processing based on outputs from a sensor, such as an angular velocity sensor or an acceleration sensor, that a back-and-forth movement has been done.

As a first example of a known information processing device, there is an information processing device in which in displaying an image on a display section, the inclination of the device is detected and the orientation of the image to be displayed on the display section is changed according to the detected inclination. As a second example of the known information processing device, there is an information processing device in which the inclination of the device is detected and the screen image layout of information on a display section is changed according to the detected inclination.

Furthermore, there is a third example of the known information processing device in which the orientation of an image to be displayed on a display section is changed according to the inclination of the device, but the orientation is prevented from being changed if the device is swung by the operator and the acceleration of the swinging is greater than a predetermined value.

It is also conceivable to use, in place of an ID card, such as a company ID card, the above first to third examples of the known information processing device. In this regard, the ID card needs to be used in a state hanging from the user's neck with a strap or the like or like states to show user's information (contents), including his/her face photo and department, to persons opposite. Therefore, in the case of using an information processing device as a substitute for an ID card, it is required to always display user's information, such as his/her face photo and department, on the display section and additionally to enable the display on the display section to switch among various types of contents.

However, since in the first and second examples of the known information processing device the display of an image on the display section is changed according to the inclination of the device, an inclination of the device during hanging from the user's neck with a strap causes the user's information on the display section to be changed, which makes it inconvenient to use the device as a substitute for the ID card. Since the above technique of the third example is nothing more than a technique in which the orientation of display on the display section is prevented from being changed when the acceleration of swinging of the device is greater than the predetermined value, the user's information being displayed on the display section is naturally changed when the device swings. Therefore, this device is also inconvenient as a substitute for the ID card.

Furthermore, in order to enable the display on the display section to switch to various other images in the techniques of the first and second examples, it is necessary to operate keys on the device. However, additional provision of operating keys on the device for use in place of an ID card interferes with the reduction is size and thickness of the device.

Unlike the above, this embodiment enables provision of an information processing device that performs functions suitable as a substitute for an ID card and allows the display to easily switch among various types of contents.

Although in the above embodiment the display switches among a plurality of types of contents previously stored in the storage section 13, various types of contents transmitted from external transmitters (such as beacons) may be received by the communication section 14 of the information processing device 10 and the control section 21 may allow the storage section 13 to store the received various types of contents in association with different directions of displacement of the information processing device 10 and allow the display section 12 to display the contents according to the orientation or the direction of displacement of the information processing device 10 determined by the determination section 22.

For example, when information (contents) on a lunchroom or a meeting room is transmitted to the information processing device 10 from a transmitter provided in the lunchroom or the meeting room, the communication section 14 of the information processing device 10 receives the contents. The control section 21 allows the storage section 13 to store the contents in association with, for example, a back-and-forth turning of the device in the vertical direction V. Then, when the information processing device 10 held upside down is turned back and forth in the vertical direction V and the determination section 22 determines the back-and-forth turning of the information processing device 10 in the vertical direction V, the control section 21 reads from the storage section 13 the contents associated with the back-and-forth turning in the vertical direction V and allows the display section 12 to display the contents.

Alternatively, the control section 21 may receive various types of contents through the communication control section 23 and the communication section 14 from an external server, allow the storage section 13 to store these different types of contents in association with different directions of displacement of the information processing device 10 as described above, read from the storage section 13 the contents associated with the direction determined by the determination section 22, and allow the display section 12 to display the read contents.

Although in the above embodiment the back-and-forth turning in the horizontal direction H, the back-and-forth turning in the vertical direction V, the back-and-forth movement in the X-axis direction, and the number of back-and-forth movements are cited as examples, a plurality of types of contents associated with a back-and-forth turning in another direction, a back-and-forth movement in another direction, the number of back-and-forth turnings above, and the number of back-and-forth movements above may be previously stored in the storage section 13 and, upon determination of the back-and-forth turning in the other direction, the back-and-forth movement in the other direction, the number of back-and-forth turnings above or the number of back-and-forth movements above by the determination section 22, the control section 21 may read from the storage section 13 the contents associated with the determined back-and-forth turning in the other direction, back-and-forth movement in the other direction, number of back-and-forth turnings above or number of back-and-forth movements above and allow the display section 12 to display the read contents.

Furthermore, just before the voltage of a battery of the information processing device 10 decreases to make it difficult for the display section 12 to make the display switch among various types of contents, the control section 21 may allow the display section 12 to display a notification indicating that the battery will run out soon. For example, when the control section 21 compares the voltage of the battery with a preset threshold value and finds that the voltage of the battery has decreased to the threshold value, it allows the display section 12 to display a message indicating that the battery will run out soon.

Moreover, an IC chip similar to a general IC card may be built in the information processing device 10 or a bar code or magnetic stripe indicating identification information may be provided on the outside of the housing of the information processing device 10.

Although in the above embodiment the strap ST is used in order that the user removably wears the information processing device 10 on his/her body, other members, such as a clip, may be used.

The structure and configuration described in the above embodiment with reference to FIGS. 1 to 9 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A back-and-forth displacement detecting device comprising:
   a sensor that detects an amount of displacement of an information processing device and outputs a detection signal indicating the amount of displacement;
   a display; and
   a control unit that includes a processor and, through the processor executing a control program, functions as:
      a determination section that determines that, if the amount of displacement indicated by the detection signal exceeds a positive threshold value in one of a former period and a latter period which are time periods of predetermined length before and after a point in time when the detection signal indicates an amount of displacement of zero, the amount of displacement indicated by the detection signal in the other of the former period and the latter period falls below a negative threshold value, and a sum of the amounts of displacement indicated by the detection signal over both the former and latter periods falls within a predetermined range, the information processing device has performed a displacement of back-and-forth movement from an initial state and has returned to the initial state; and
      a control section that changes, when the determination section determines what type of displacement of back-and-forth movement the information processing device has performed, contents to be displayed on the display according to the determined type of displacement of back-and-forth movement,
   wherein the sensor detects an acceleration or an angle of turn generated on the information processing device,
   the determination section determines, with a screen image displayed on the display and based on the acceleration or the angle of turn detected by the sensor, whether a vertical orientation of the information processing device is a predetermined vertical forward direction or a vertical reverse direction, and
   the control section, (i) when the orientation of the information processing device determined by the determination section is the predetermined vertical forward direction, allows the display to display predetermined contents, and when the orientation of the information processing device determined by the determination section is the vertical forward direction, maintains the display of the predetermined contents on the display regardless of what type of displacement of back-and-forth movement has been determined by the determination section, and (ii) when the orientation of the information processing device determined by the determination section is the vertical reverse direction, counts a number of times of the back-and-forth displacement cyclically within a range from 1 to a predetermined upper limit times to obtain a count value cyclically from 1 to the upper limit, and allows the display to display the contents corresponding to the count value with the contents oriented vertically opposite to the orientation of display in which the predetermined contents is displayed when the orientation is the vertical forward direction.

2. The information processing device according to claim 1, wherein the information processing device has the shape of a portable card and further comprises a fitting member with which the information processing device is worn on a user's body.

3. The information processing device according to claim 1, wherein when the orientation of the information processing device determined by the determination section changes from the vertical reverse direction to the vertical forward direction and the determination of the vertical forward direction by the determination section is retained for a specified time, the control section allows the display to display the predetermined contents again.

4. The information processing device according to claim 1, further comprising a storage device that stores a plurality of types of contents associated with respective directions of displacement of the information processing device, wherein the determination section determines the direction of displacement of the information processing device, and when the orientation of the information processing device determined by the determination section is the vertical reverse direction, the control section selects, among the plurality of types of contents stored in the storage device, the contents associated with the direction of displacement determined by the determination section and allows the display to display the selected contents.

5. The information processing device according to claim 4, further comprising a communication interface that receives contents transmitted from an external terminal device, wherein the control section allows the storage device to store the received contents in association with a direction of displacement of the information processing device.

6. The information processing device according to claim 1, wherein when a voltage of a battery of the information processing device decreases to a preset threshold value, the control section allows the display to display a message indicating that the battery will run out soon.

* * * * *